Aug. 14, 1945.   W. F. JUDD   2,382,064
CALCULATING DEVICE
Filed June 4, 1943

INVENTOR:
William F. Judd.
BY Arthur C. Brown
ATTORNEYS.

Patented Aug. 14, 1945

2,382,064

UNITED STATES PATENT OFFICE 2,382,064

CALCULATING DEVICE

William F. Judd, North Kansas City, Mo.

Application June 4, 1943, Serial No. 489,642

3 Claims. (Cl. 235—70)

This invention relates to a computer, and more particularly to a computer adapted to the work of an aircraft pilot or navigator.

It has been the practice to solve the problems on navigation and operation of aircraft with the aid of a number of various instruments which require a considerable degree of dexterity on the part of the pilot when he must at the same time keep the aircraft under control.

It is therefore the principal object of the present invention to provide a single instrument from which the necessary calculations can be quickly and easily accomplished in limited space and in connection with the other duties a pilot or navigator is called upon to perform.

It is also an object of the invention to provide a computer with removable scales whereby a combination of scales may be assembled in the computer which are best suitable to the work in hand.

A further object of the invention is to incorporate the computer in a pencil by which the calculations are entered in the flight log.

In accomplishing these and other objects of the invention, I have provided an improved structure, the preferred form of which is illustrated in the accompanying drawing, wherein.

Figure 1:
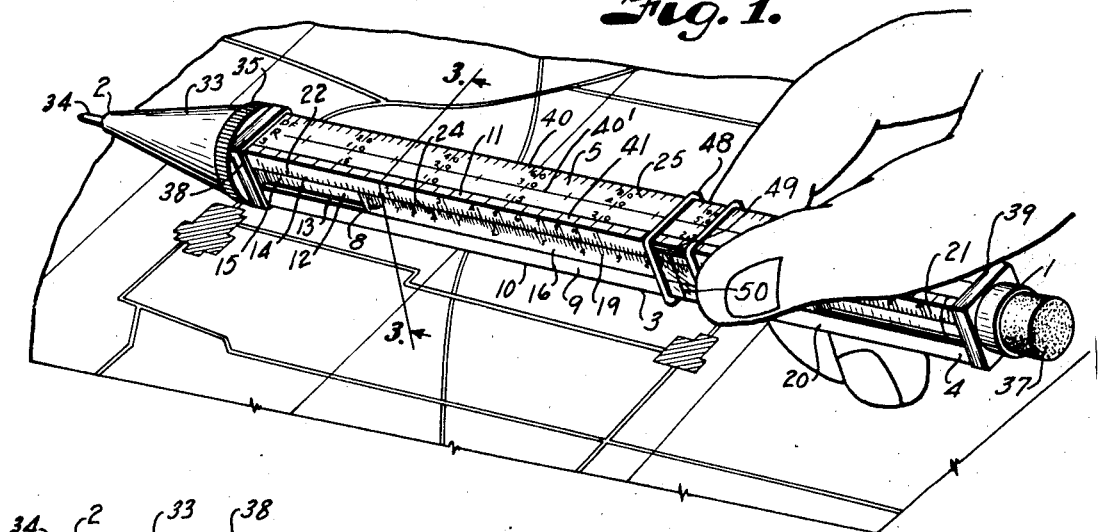
Fig. 1 is a perspective view of a computer incorporated in a pencil and constructed in accordance with the present invention and illustrating the use thereof in determining distance on a map or chart used in navigation of aircraft.
Figure 2:
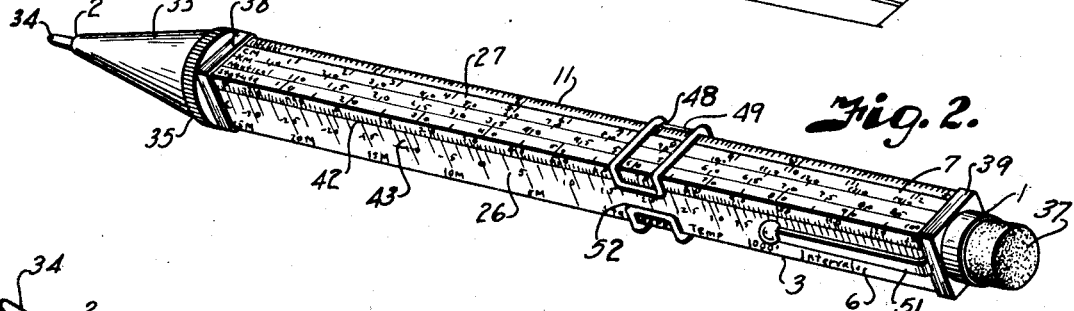
Fig. 2 is a perspective view of the device as it appears from the side opposite to that shown in Fig. 1.

Referring more in detail to the drawing:

1 designates a computer constructed in accordance with the present invention and which is especially adapted to calculations of problems in the operation of aircraft. The computer in its preferred form is incorporated in a writing instrument 2, such as a pencil, and includes an elongated body 3 of polygonal cross section to provide a number of plane faced sides, any two adjacent sides of which may be viewed simultaneously without turning the instrument. I have found in practice that a body having four plane side faces, 4, 5, 6 and 7, arranged with adjacent faces forming right angles to each other is best suitable to my purpose since the adjacent faces are readily observed and the device is easier to manipulate. The body 3 substantially conforms in length to that of a pencil and the interior thereof is hollowed to contain a pencil mechanism later described. Attached to one of the faces, for example, the face 4, is a slide rule 8 which includes a stationary member 9 conforming in width to the face 4 in order that the side edges 10 and 11 form continuations of the faces 5 and 7 and the length of the strip corresponds to that of the body 3. Formed within the central portion of the stationary member 9 is a longitudinal groove or channel 12 having inwardly extending lips 13 and 14 spaced above the bottom 15 thereof to retain a slide 16 conforming in cross-sectional shape to that of the channel and which has rabbeted sides 17 and 18 to accommodate lips 13 and 14 and to permit the intermediate face portion 19 to register with the face portions 20 and 21 on the sides of the guide channel. The slide is of relatively shorter length than the stationary member to allow sufficient longitudinal movement of the slide to make the necessary calculations without projecting the ends beyond the ends of the fixed member. The face portion 21 is ruled with a conventional double logarithmic scale 22. Likewise ruled upon the face 19 of the slide is a single logarithmic scale 24 which is arranged to be adaptable for solution of problems pertinent to the navigation and operation of aircraft; for example, a sliding logarithmic scale 6 . . . 1 . . . 6 is used since the most common mathematical problems involve calculations of speed, distance, and fuel consumption. This selection of the slide scale is also adaptable to the short length slide and in no way detracts from solution of other problems since the short scale allows for full use of both of the fixed scales without projection of the slide member beyond the ends of the body 3.

Figure 3:
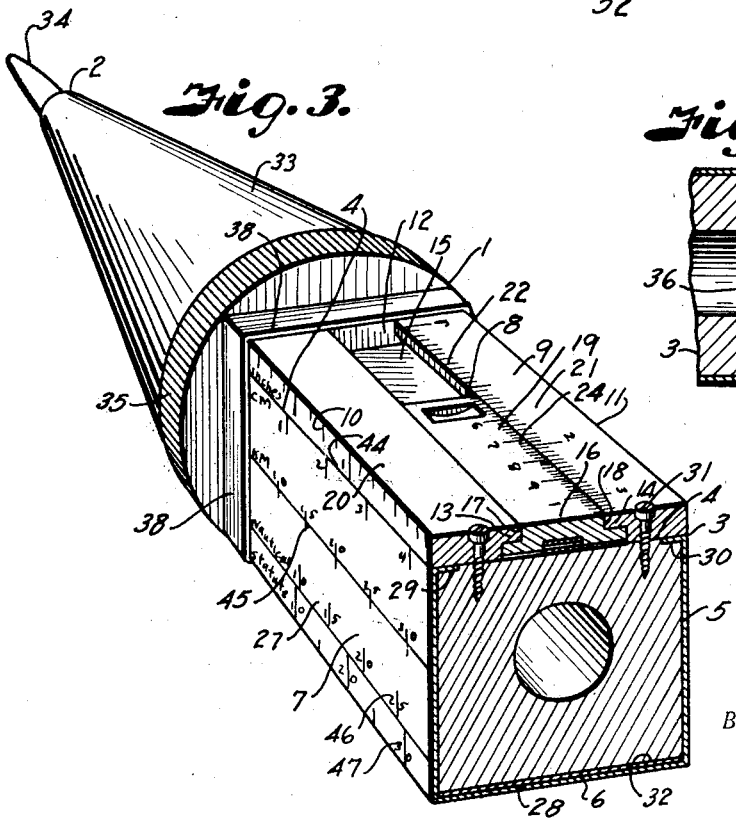
Fig. 3 is an enlarged perspective cross section through the pencil on the line 3—3, Fig. 1.
Figure 4:
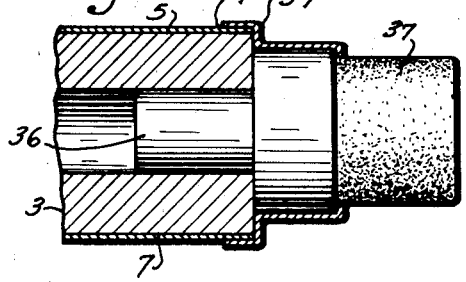
Fig. 4 is a fragmentary longitudinal section through the clip end of the pencil.

Attached to the other faces 5, 6 and 7 of the body 3 are fixed scales 25, 26 and 27. For a matter of convenience in construction and to permit ready substitution of at least one of the scales for a scale suited to any particular purpose for which the computer is used, the scales 25 and 27 are printed in spaced parallel relation on a sheet of transparent material having substantially the length of the body 3 and of a width sufficiently greater than the combined width of the faces 5, 6 and 7 to provide a central transparent panel 28 having the width of the face 6 and to provide flanges 29 and 30 when the strip is folded about the corners of the body 3 to cover the faces 5, 6 and 7. When thus folded, the flanges 29 and 30 underlie the edges of the slide rule and are clamped thereby against the face 4 when the slide rule is attached to the body 3 by fastening devices 31. The fastening devices 31 may comprise small screws extending through openings in the fixed member of the rule and into the body of the computer as shown in Fig. 3. The scale 26 is printed on a separate strip 32 inserted between the face 6 and the panel 28 to be visible therethrough. It is therefore obvious that other scales may be used in conjunction with the scales 25 and 27 by substituting a strip 32 having the desired scale.

Mounted within one end of the body 3 is a pencil lead feeding mechanism including a conical head 33 which forms a continuation of the body 3. It is obvious that any suitable pencil mechanism may be employed to feed the lead 34 from the point of the head 33, which mechanism may be actuated by a knurled wheel 35. The opposite end of the body 3 carries a lead storage compartment 36 projectable within the hollow of the body and which carries an eraser 37.

The ends of the strip on which the scales 25 and 27 are printed are protected by ferrules 38 and 39 that are spaced from the faces of the computer to form grooves to receive the ends of the strip. The ferrule 38 is preferably fixed to the body 3 but the other ferrule is removable after removal of the lead carrier to permit replacement or interchange of scales.

In the device illustrated, the scale 25 includes three linear series of graduations, 40, 40' and 41, representing the number of statute miles per inch of a standard direction finding chart (D/F) (scale 1:2,000,000—32 miles to the inch); a regional aeronautical chart (R) (scale 1:1,000,000—16 miles to the inch); and a sectional aeronautical chart (S) (scale 1:500,000—8 miles to the inch) respectively. The scale 26 includes a Fahrenheit/centigrade temperature conversion scale 42 and a related standard temperature scale 43 marked with graduations representing temperature for each 1,000 ft. level from zero to 25,000 feet elevations. The scale 27 includes linear measures; for example, an inch measure 44 and a centimeter measure. The scale also includes related kilometer, nautical mile and statute mile scales 45, 46 and 47 respectively.

The computer is provided with a cursor 48 slidable over the body 3 and has a transparent window 49 provided with a mark 50 to facilitate reading of the scales. The computer also includes a pocket clip 51 by which it may be fastened in the pocket of the user. In order to allow movement of the cursor the full length of the scale, the cursor is constructed with a gap 52 on the clip side to pass the tongue of the clip when the cursor is moved to that end of the scale.

A computer constructed and assembled as described is used as follows:

Pilots and navigators in the navigation of aircraft may use a direction finding chart, a regional aeronautical chart and a sectional aeronautical chart. Any or all of these charts may be used on a single flight from one point to another no matter how near or distant the destination. The navigation requires repeated measurements of distance between cities, rivers and other check points throughout the flight. To use the computer in connection with these charts, it is merely necessary to place the zero end of the scale 25 on one point of the chart and slide the cursor to the other point of the chart. There is no need to refer to the scale while this measurement is being made. After completing the measurement, the computer is lifted off the chart and the distance read from the scale of the chart being used, the distance being read from the mark line on the cursor; for example, if a regional aeronautical chart is used, a notation is made of the registering point of the mark on the cursor relatively to the scale 25, the distance from the zero end of the scale to the mark on the cursor being the distance between the points on the chart.

If a sectional aeronautical chart is used, the notation is made of the registering point of the mark on the cursor with the graduations of the scale 41.

If the direction finding chart is used, the position of the mark on the cursor is noted with respect to the scale 40. If the computer is held so that both the face of the slide and the scale 25 are simultaneously visible, the desired speed distance problem may be solved on the slide rule. The computer is then turned in hand and used as a pencil to make note of the determined problem on the navigation log. All of this may be accomplished readily with one hand, freeing the other hand of the pilot to perform the necessary flight duties.

In present-day aircraft, a pilot often finds some of the instruments calibrated in degrees Fahrenheit and others in degrees centigrade. Likewise, many engine operating charts are in degrees Fahrenheit and others in degrees centigrade. It is therefore necessary to make conversion in order to solve problems relating to operation of the airplane and its equipment. Conversion of Fahrenheit to centigrade or centigrade to Fahrenheit is readily noted by comparing the Fahrenheit and centigrade graduation on the scale 26. The scale relating to temperature at each thousand foot level is useful in solving many of the fundamental problems of meteorology. This portion of the scale 26 is also useful in solving manifold pressure, horsepower and revolutions per minute problems. After the revolutions per minute and horsepower have been set, the computer may be turned within the fingers so that the slide rule comes into position. The indicated air speed in true air speed problems may then be solved with the aid of the slide rule.

In modern flying it is sometimes necessary to use foreign charts, the scale of which may be stated in kilometers per centimeter, miles per inch or stated as a proportion (such as 1:1,000,-000) or perhaps simply by means of a scale with marked graduations indicating the value of a given distance. A readily usable scale may be had by using the inch/centimeter and nautical mile/statute mile and kilometer scale, converting a difficult or unusable scale to terms to fit the scale being operated; for example, if the air speed indicator is calibrated in knots per hour and a chart whose scale is given in kilometers per centimeter or inches per mile is being used, they may be converted to a common term in order that problems of navigation may be solved. Also, many navigation problems require conversion of miles or kilometers into nautical miles (knots), or vice versa. This is readily accomplished on the scale 26. At the same time, the logarithmic scale is clearly visible for solution of mathematical problems pertaining to the figures being used. As previously stated, the logarithmic scales selected on the slide rule have been found to lend most aptly to an instrument for use of the pilot or navigator. Due to the fact that there are 60 minutes in an hour (the figure used in speed/distance solutions) and also that one gallon of fuel weighs 6 pounds (fuel consumption being stated in pounds per horsepower hour) the selection of sliding logarithmic scales of 6 ... 1 ... 6 makes most convenient the solution of speed/distance and fuel problems, all interrelated and very important in the safe operation and navigation of aircraft.

Emphasis is again made on the fact that all of the operations described, in addition to many others, are performed with one hand, the other hand being left free to handle the controls of an airplane or perform other acts which are necessary to keep an aircraft under control. In many modern aircraft there is no space for any personnel other than the pilot himself and it is necessary for him to handle both the operation and navigation of aircraft. This calls for a certain degree of ambidexterity on the part of the pilot but the present computer facilitates the pilot's work.

While I have particularly illustrated and described the invention as applicable to the use of a pilot or navigator, it is obvious that the invention may be carried out in a computer adapted for any branch of engineering by providing scales having the desired graduations. This is readily accomplished by applying a printed strip to the body of the computer in the manner above described.

What I claim and desire to secure by Letters Patent is:

1. A device of the character described including an elongated body member having a plurality of side faces, a removable member disposed upon one of said side faces, a transparent sheath covering the removable member to retain said member upon said side face and having marginal edges overlying side edges of another of said faces, a substantially rigid member disposed upon the face engaged by said edges of the sheath and having side portions extending over said marginal edges of the sheath, and fastening devices for securing the substantially rigid member to said body for retaining the sheath.

2. A device of the character described including an elongated body member having a plurality of side faces, a removable strip-like member disposed upon one of said side faces, a transparent sheath covering said removable member and having marginal side edges overlapping side edges of another of said faces, a stationary member having longitudinal side portions overlying said side edges of the sheath and having inwardly extending lips cooperating to form a guideway, a slidable member in said guideway and retained by said lips, and fastening devices for securing said side portions to the body member in securing relation with the side edges of said sheath.

3. A device of the character described including an elongated body member having a plurality of side faces, a removable sheath for the body member having side edges engaging over side edges of one of said faces, a substantially rigid member disposed upon one of said faces and having side portions overlying the edges of the sheath and provided with inwardly extending lips to form a guideway between said edges of the sheath, a member slidable in the guideway and retained by said lips, and fastening devices extending through said side portions and into the body member to clamp the edges of the sheath to the body member.

WILLIAM F. JUDD.